Feb. 24, 1959 — M. HUFF ET AL — 2,874,497
SLIDE MAGAZINE ADVANCING MEANS
Filed Dec. 20, 1956 — 2 Sheets-Sheet 1

INVENTOR.
MALVIN HUFF
FRANK J. CASSIE

INVENTOR.
MALVIN HUFF
FRANK J. CASSIE

United States Patent Office 2,874,497
Patented Feb. 24, 1959

2,874,497

SLIDE MAGAZINE ADVANCING MEANS

Malvin Huff, Mount Vernon, N. Y., and Frank J. Cassie, Montclair, N. J., assignors to Viewlex, Inc., Long Island City, N. Y., a corporation of New York Application December 20, 1956, Serial No. 629,624

3 Claims. (Cl. 40—79)

This invention relates to slide magazine advancing means for slide projectors and more particularly to reversible slide advancing means.

Modern automatic and semi-automatic slide projectors are generally of the type wherein a slide magazine or tray of slides is inserted in the projector and automatically advanced as the various slides are viewed. The slide magazines or trays are removable and are used for storing the slides so that the slides need never be touched by hand. This method has been so convenient that it has been universally adopted.

However, heretofore it has not been possible to reverse the movement of the magazine or tray in the projector. It is frequently desirable to do this in order to repeat a slide or to review a slide after it has been passed in normal sequence. It is also sometimes desirable to compare two slides, and in many cases it is desirable to show the slides in a reverse sequence.

The present invention provides means for accomplishing these desirable objects and provides a slide magazine advancing means having forward, neutral, and reverse positions. The magazine is of the conventional type accommodating approximately thirty slides and having a rack molded into the body of the magazine or attached thereto. The magazine or tray is advanced by a first gear which engages the rack. A second gear is connected on the same shaft as the first gear and it is adapted to be engaged by a forward pawl or a reverse pawl which may be actuated manually or by a motor. The two pawls are mounted on a sliding plate which has detented positions for forward and reverse movement and also has a neutral position. In forward position, one pawl actuates the gear in one direction and in the reverse position the second pawl actuates the gear in the reverse direction. A neutral position is provided between the two operating positions so that the slide tray may be adjusted by hand or removed, for instance, for loading.

Accordingly, a principal object of the invention is to provide new and improved slide tray advancing means.

Another object of the invention is to provide new and improved slide tray advancing means having forward, reverse and neutral positions.

Another object of the invention is to provide new and improved slide tray advancing means comprising a first gear adapted to engage a rack in said tray, a second gear mounted on the same shaft as said first gear, and a double pawl arrangement mounted on a sliding plate, one of said pawls being adapted to advance the said tray in a forward direction and the other of said pawls being adapted to advance the tray in the reverse direction.

These and other objects of the invention will be apparent from the following specification and drawings, of which:

Figure 1:
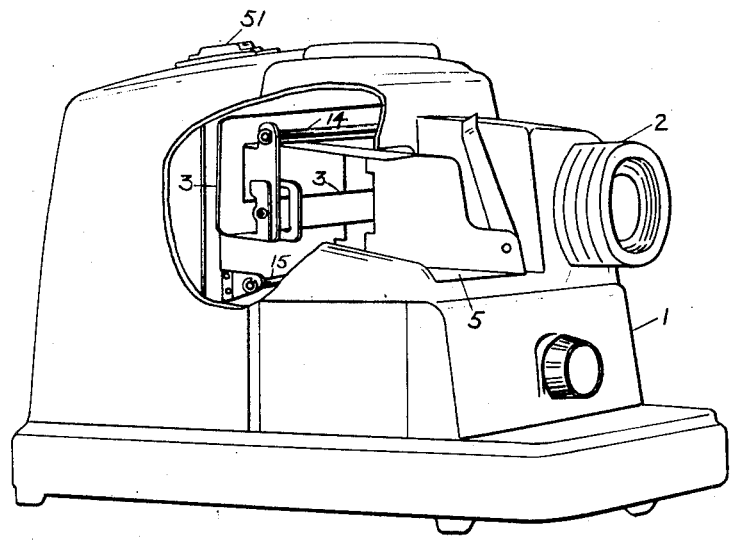
Figure 1 is a perspective view, partially cut away, of a projector embodying the invention.

Referring to the figures, Figure 1 shows a slide projector 1 of the type accommodating a removable slide tray of the conventional type accommodating about thirty slides. The optical portion of the projector, including the focussing lens 2, is on one side of the projector, and the magazine or tray for the slides is inserted in the front or the rear of the projector in the other side thereof parallel the optical axis. Slides are pushed from the tray into projecting position along the optical axis by means of a pusher member 3 which is adapted to slide transversely. As will be explained hereafter, means are also provided to index the slide tray automatically with each stroke of the pusher member 3. The pusher member may be actuated manually in semi-automatic machines or may be actuated by a motor in fully automatic machines. Projectors of this type are shown in co-pending applications S. N. 552,428 and S. N. 554,438, filed December 12, 1955, and December 21, 1955, respectively, in the name of David Pollan, entitled Automatic Slide Projector, and Powerized Automatic Slide Projector, respectively.

In those previous applications, the magazine could only be indexed in one direction. The present invention provides means for indexing the magazine forwardly or in a reverse direction. This is frequently desirable in order to re-view a slide which has been previously shown, to show the slides in a reverse sequence, or to compare two slides repeatedly.

Figure 2:
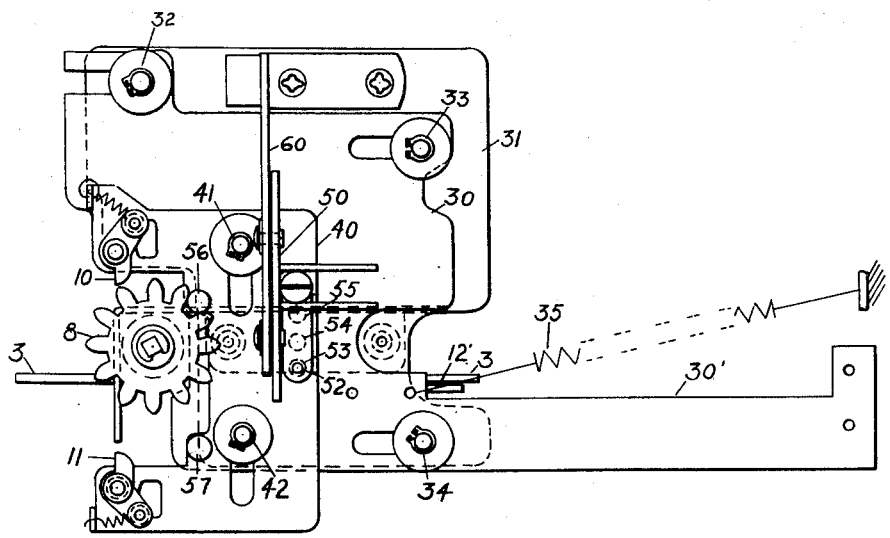
Figure 2 is a plan detail view of an embodiment of the invention.
Figure 3:
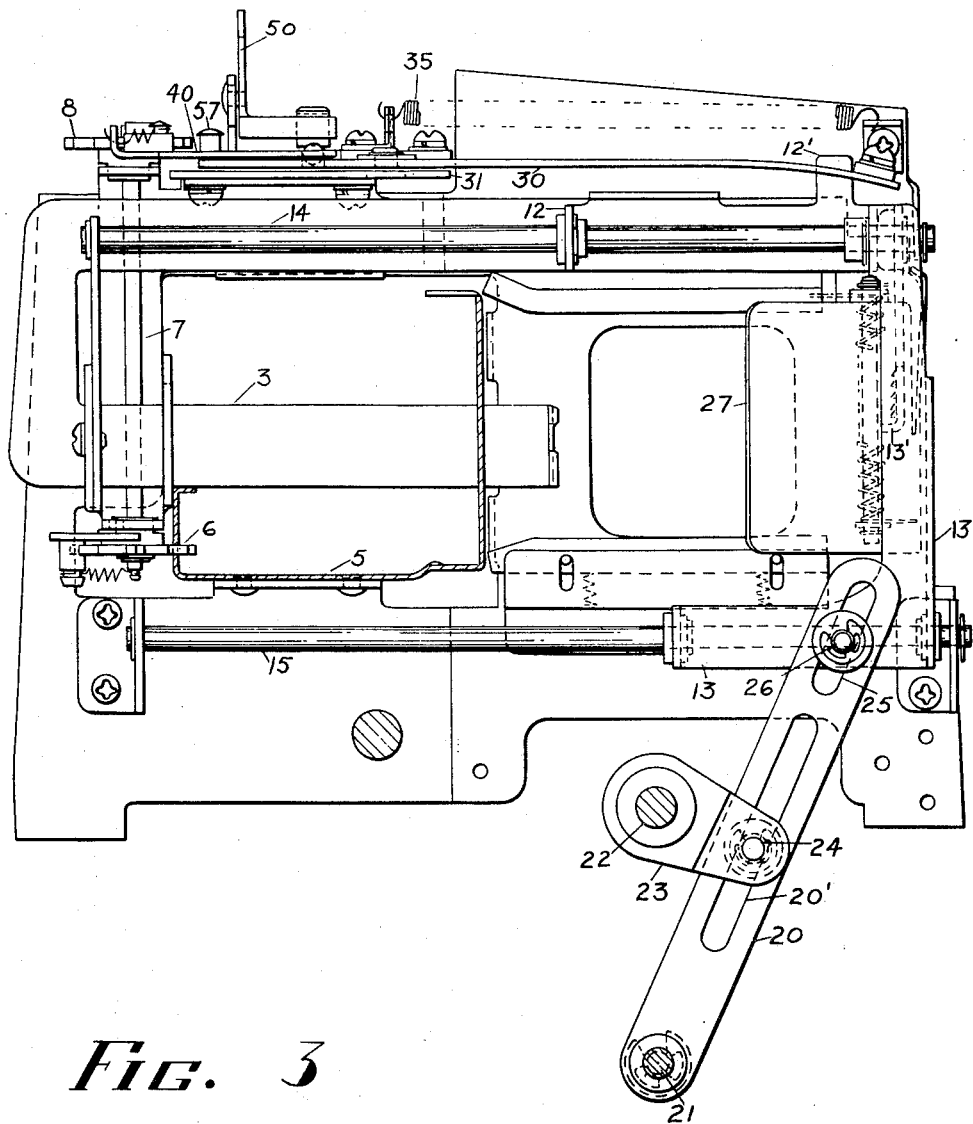
Figure 3 is an elevation detail view of the embodiment of Figure 2.

As described in the above mentioned applications and also referring to Figures 2 and 3, the magazine tray, not shown, is inserted in the track 5 and has a rack cut or molded therein, which is adapted to engage the gear 6. The gear 6 is rotatably mounted on a square shaft 7 which has another gear 8 at its upper end. The gear 8 is adapted to be engaged by either of the pawls 10 or 11 depending upon which direction it is wished to advance the tray, as will be explained.

Referring to Figure 3, the pusher member is slidably mounted and is fixedly connected to a sliding plate 12 which is fixedly connected to an L-shaped member 13. Therefore, the pusher member, the plate member 12 and the L-shaped member 13 are fixed together and are slidably mounted on the guide rails 14 and 15, which are fixedly mounted on the frame. The pusher member is motor driven by means of a sliding pin and slot linkage as follows: An arm 20 is rotatably mounted on the frame at the point 21 and is connected to the motor shaft 22 by means of arm 23 and pin 24 which engages the slot 20' in the arm 20. The upper end of the arm 20 contains another slot 25 which is pinned to the sliding L-shaped member by the pin 26. The motor connections are conventional and are described in the latter of the previous applications above mentioned. A shutter 27 is pivotally mounted to the frame and adapted to be opened by the action of the sliding members.

The slide tray reversible indexing means, to which the present invention primarily relates, is as follows: A first plate 30 is slidably mounted on a fixed plate 31 by the pin and slot connections 32, 33, and 34. The plate 30 has a long extension portion 30' which acts as a safety stop and is spring loaded to the frame by the spring 35. As shown in Figure 2 the plate 31 may be moved to the left by the projection 12' of the sliding plate 12 contacting the edge of the plate 31 and moving it against the force of the spring 35. Therefore, the plate 31 moves with the pusher member 3 transversely to the optical axis and the axis of movement of the slide magazine.

A smaller axially moving plate 40 is slidably mounted on top of the plate 30 by means of the pin and slot connections 41 and 42. The purpose of this movement is to engage either the pawl 10 or 11 with the gear 8. In the position shown in Figure 2 the pawl 10 will engage the gear and rotate it counterclockwise moving the slide magazine towards the back of the projector. It is noted that the slide tray movement takes place on the return stroke of the pusher member which returns the slide to the tray. The slide is returned by a member 13' connected to the sliding L-shaped member 13, Figure 3.

The sliding plate 40 may be moved fore and aft by means of the handle 50 which extends above the top of the projector terminating in a knob 51, Figure 1. The axially sliding plate 40 preferably has three detented positions, namely, forward, neutral and reverse positions. The positions are indexed by a spring and ball detent 52 which engages three holes 53, 54, and 55 in the transverse plate 30. After the pawl 10 has moved the gear, a pin 56 fixedly mounted on the plate 40 then fits between two teeth of the gear 8, thereby accurately positioning the slide tray. A corresponding pin 57 acts in connection with the pawl 11. The handle 50 is pinned to a guide 60 fastened to the frame, the pins extending through a slot in the guide 60.

Therefore, the present invention provides a slide magazine which is adapted to move a removable tray either forwardly or backwardly. A neutral position is also provided for moving the tray by hand and removing it.

Various modifications will occur to those desiring to practice the invention, and various mechanical equivalents for components may be used without departing from the scope of the invention.

We claim:

1. In a slide projector of the type adapted to receive a removable slide tray having a rack thereon and adapted to move a slide and index said magazine with the same motion, means to advance said tray in forward and reverse directions comprising a first gear adapted to engage said rack, a second gear connected to said first gear, a sliding plate movable in two perpendicular directions adjacent said second gear, a pair of pawls mounted on said plate, the first of said pawls adapted to engage said second gear to turn it in one direction and the second of said pawls adapted to engage said second gear to turn it in the opposite direction as said sliding plate is moved.

2. In a slide projector of the type adapted to receive a removable slide tray having a rack thereon and adapted to move a slide and index said magazine with the same motion, means to advance said tray in forward and reverse directions comprising a first gear adapted to engage said rack, a second gear connected to said first gear, a sliding plate movable in two perpendicular directions adjacent said second gear, a pair of pawls mounted on said plate, the first of said pawls adapted to engage said second gear to turn it in one direction and the second of said pawls adapted to engage said second gear to turn it in the opposite direction, and detent means connected to said plate adapted to index said plate in forward, reverse, and neutral positions.

3. In a slide projector of the type adapted to receive a removable slide tray having a rack thereon and adapted to move a slide and index said magazine with the same motion, means to advance said tray in forward and reverse directions comprising a first gear adapted to engage said rack, a second gear connected to said first gear, a sliding plate movable in two perpendicular directions adjacent said second gear, a pair of pawls mounted on said plate, the first of said pawls adapted to engage said second gear to turn it in one direction and the second of said pawls adapted to engage said second gear to turn it in the opposite direction, detent means connected to said plate adapted to index said plate in forward, reverse and neutral positions, and means to actuate said pawls to move said tray.

References Cited in the file of this patent
UNITED STATES PATENTS

| | | |
|---|---|---|
| 633,623 | Squire et al. | Sept. 26, 1899 |
| 867,197 | Hamm | Sept. 24, 1907 |
| 949,397 | Magone | Feb. 15, 1910 |
| 2,732,758 | Waller | Jan. 31, 1956 |
| 2,756,630 | Goldberg | July 31, 1956 |